June 21, 1966 H. R. CEDERBERG 3,257,057

MAGNETIC TAPE GUIDE MECHANISM

Filed June 23, 1965

INVENTOR

Howard R. Cederberg

BY Hovey, Schmidt, Johnson & Hovey

ATTORNEYS.

United States Patent Office 3,257,057
Patented June 21, 1966

3,257,057
MAGNETIC TAPE GUIDE MECHANISM

Howard R. Cederberg, Tulsa, Okla., assignor to Midwestern Instruments, Inc., Tulsa, Okla., a corporation of Oklahoma Filed June 23, 1965, Ser. No. 466,317
5 Claims. (Cl. 226—199)

This is a continuation-in-part of an application for U.S. Letters Patent by Jack W. Clymer and Howard R. Cederberg Serial No. 340,139, filed January 27, 1964, now abandoned.

This invention relates generally to structure for supporting and guiding magnetic tape along a desired path of travel and, more specifically, to mechanism for shifting moving magnetic tape toward and away from a position where the tape is in operative engagement with a transducer head or heads.

In tape transports, particularly of the type where a plurality of transducer heads are employed to record and reproduce information on the tape, it is usually desirable to provide some means of selectively placing the tape into or out of engagement with the transducer heads. The primary purpose of such means is to enable the tape drive mechanism to advance the tape at speeds greatly exceeding the normal recording speeds thereof without subjecting the tape to the frictional forces that would be produced if it remained in contact with the heads. High speed driving of the tape is employed to rapidly move the tape to a selected portion thereof or to rewind the tape onto the storage reel after the recording or reproducing operation.

If means is to be provided for effecting shifting of the tape into or out of engagement with the heads, it has heretofore been requisite that the components of the shifting mechanism be constructed to very high tolerances to assure that the tape will always assume the same position when it is placed in engagement with the heads. This has been achieved through the use of a swinging gate or carrier having a guide thereon that received and supported the tape. A hinge was commonly employed as a suspension for the gate, requiring that the gate assembly be precisely fabricated and accurately aligned when installed.

It should be appreciated that maladjustment of the swinging tape carrier or similar structure of the prior art would materially affect the operation of the recorder. Tilting of the axis of swinging movement of the carrier would cause the tape wrap angles for the various heads to be different, resulting in a variation of the frequency response among the heads. This, of course, created problems in the equalized amplifier stages of the recorder in that the response of each head would now be different from that for which the amplifiers were designed. In multichannel systems misalignment of the longitudinal axis of the tape with the heads would cause adjacent channel pickup. Furthermore, the arcuate path described by the tape, during swinging thereof into engagement with the heads, had to be precisely set to assure that the face of the tape would be flush with the heads upon engagement therewith.

It is, therefore, the primary object of this invention to provide an improved tape gate or carrier for the transducer heads of a tape transport that may be fabricated and placed into operation without the precision machining and setting heretofore required.

Another important object of this invention is to provide a tape gate or carrier as aforesaid which will assume a desired, proper disposition upon shifting movement thereof to place the tape in engagement with the heads, without the provision of a hinge or the like as a means of shiftably mounting the carrier.

Still another important object of the instant invention is to provide a tape carrier which is mounted for movement toward and away from the heads by a flexible member, and wherein the ultimate operative disposition of the carrier is determined by stop means between the heads and the carrier so that positioning of the tape will not be dependent upon the degree of wear of a hinge mounting or manufacturing tolerances.

Other objects will become apparent as the detailed description proceeds.

Figure 1:
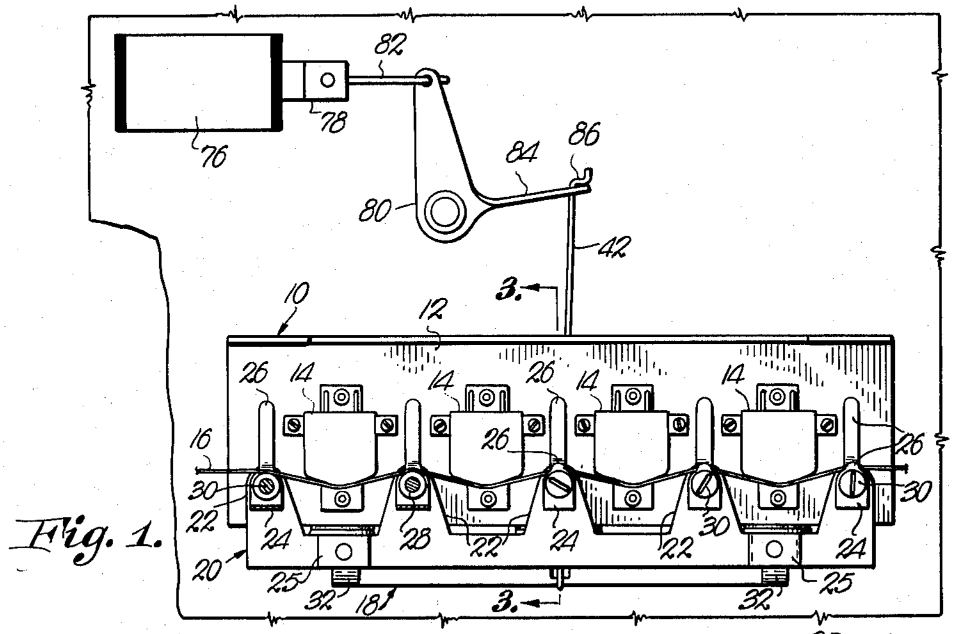
FIGURE 1 is a fragmentary view of a tape transport showing the transducer heads and the guide mechanism of the instant invention in front elevation.

The numeral 10 denotes a support in the form of a plate having a vertical offset 12, the support forming a part of the chassis of a tape transport. Magnetic tape transducer head units 14 are mounted on offset 12 in operative engagement with magnetic tape 16. The tape is held in engagement with the heads by a carrier or gate 18 which is provided with a guide assembly 20 supporting the tape.

The guide assembly 20 comprises five upstanding fingers 22 integral with the leading edge of carrier 18, fingers 22 each serving as a support for a U-shaped element 24 having a pair of upstanding legs 26. (A pair of forwardly extending projections 25 are also integral with the leading edge of carrier 18, such projections serving as mounts for a magnetic shield or other protecting structure for the head units.) Legs 26 are separated by a cylindrical spacer 28, the legs thus forming an edge guide for tape 16 as the tape is trained over spacers 28. Each U-shaped element 24 and corresponding spacer 28 is mounted on the associated finger 22 by a machine screw 30. It should be understood that the spacers 28 are highly machined and polished so as to eliminate any substantial friction between the tape and the spacers.

A pair of projections 32 extend rearwardly of carrier 18 and are interconnected by a laterally extending rib 34 on the underside of the carrier. The central portion of the carrier contains a pair of apertures 36 separated by a web 38, the lower end 40 of an actuator rod 42 being hooked over web 38 for purposes which will become clear as the specification proceeds.

A thin, plate-like, flexible, U-shaped member 44 in the form of a leaf spring is disposed beneath support 10, the bight portion 46 of the member extending adjacent the rearmost edge 48 of the support plate. Member 44 is secured to the support by a pair of fasteners 50, each comprising a machine screw and nut therefor which extends through a corresponding slot 52 in member 44. A pair of leaves or legs 54 of member 44 are connected to carrier 18 at 56 to suspend the carrier beneath support 10.

Figure 2:
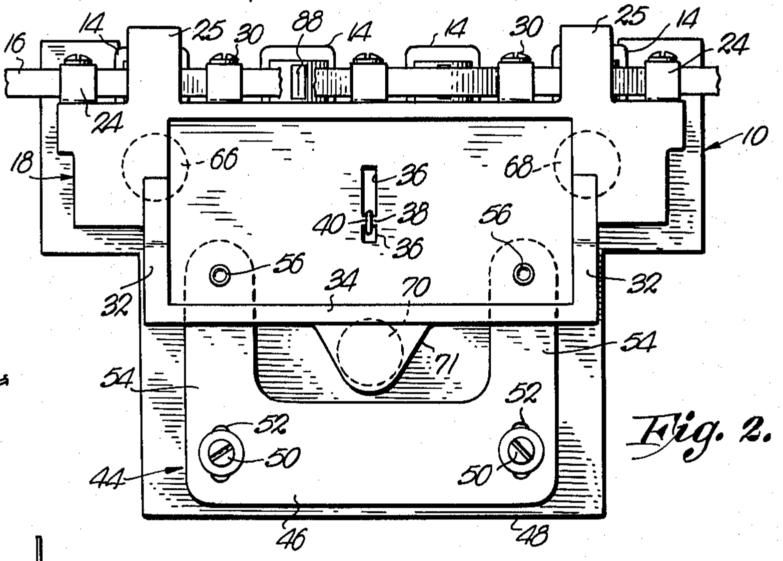
FIG. 2 is a bottom view of the heads and the guide mechanism illustrated in FIG. 1.

Three resilient contact pads 66, 68 and 70 are mounted on the upper side of carrier 18 in a triangular pattern as may be seen in FIG. 2. Pad 70 is mounted on a tab 71 which projects rearwardly from rib 34. Pads 66–70 bear against the undersurface 72 of the rearwardly extending portion of support plate 10 when the carrier is in its operative position as illustrated in full lines in the drawing. Actuator rod 42, which includes a spring 74, is employed to move the carrier into the operative position. Web 38 which serves as a connection point for end 40 of actuator rod 42, is disposed centrally of the triangle defined by pads 66–70 so that the force of the actuator rod will be substantially evenly distributed among the contact pads.

Actuation of rod 42 is effected by a solenoid 76 having a reciprocable armature 78. FIG. 1 illustrates the linkage between aramture 78 and rod 42, such linkage taking the form of a crank 80 coupled with the armature by a link 82 and interconnected with rod 42 by an opening (not shown) in crank arm 84 which receives rod 42. An offset 86 in the rod completes the interconnection with crank arm 84, it being understood that leftward movement of armature 78, when solenoid 76 is energized, effects counterclockwise rotation of crank 80 to, in turn, shift rod 42 vertically upwardly. Armature 78 is illustrated in its leftward position with solenoid 76 energized.

Figure 3:
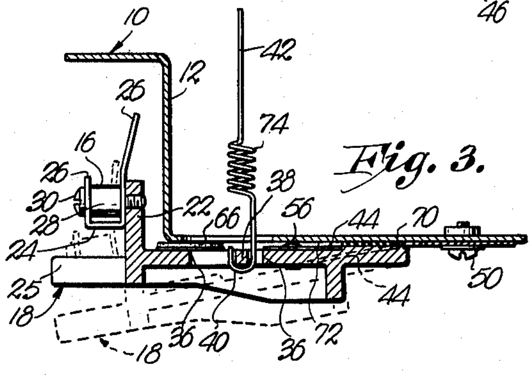
FIG. 3 is a view partially in section and partially in elevation taken substantially along line 3—3 of FIG. 1, the heads being removed for clarity of illustration and the carrier shown in its inoperative position by broken lines.

It will be appreciated that, when the various components of the mechanism are in their dispositions shown in full lines in the drawing, pads 66–70 are seated against the undersurface 72 of support plate 10 as is clearly shown. Deenergization of solenoid 76 releases rod 42 and allows carrier 18 to move away from undersurface 72 to the broken-line position illustrated in FIG. 3. Since member 70 is preferably composed of spring steel, the resilience of the member is sufficient to return carrier 18 to the broken-line position regardless of the orientation of the transport. Thus, a return spring in addition to member 70 is not required when the carrier is not horizontally disposed as herein illustrated.

Each time solenoid 76 is energized, the carrier 18 must move to the same operative position or the difficulties outlined at the outset of this specification will arise. One requisite is that the operative position of carrier 18 be such as to place tape 16 in engagement with head units 14 so that the tape wrap angles for the heads will be the same. This is accomplished by the stopping action of the pads 66–70 in cooperation with undersurface 72. It should be understood that the flexibility of member 70 allows the carrier to return to the same operative position each time solenoid 76 is energized since the member is fixed to support 10 by fasteners 50 and cannot move except by flexure thereof.

In FIG. 2, the air gap of one of the head units 14 is illustrated at 88. It will be appreciated that a multichannel head must be in proper alignment with the magnetic tape or adjacent channel pickup may occur. It may be seen in FIG. 2 that the longitudinal axis of the tape extends perpendicularly of gap 88 and that the tape is centered with respect to the gap. If the tape is off-center, adjacent channel interference may occur or, if the longitudinal axis of the tape forms other than a right angle with gap 88, then adjacent head units may not be simultaneously aligned with the same channel on the tape.

During fabrication of the mechanism, slots 52 permit adjustment of the position of the carrier so that proper alignment of the longitudinal axis of the tape with the heads may be effected. Tightening of fasteners 50 then securely affixes the bight portion 46 of member 44 to the support.

Figure 4:
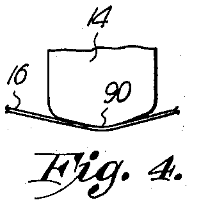
FIG. 4 is a diagrammatic illustration of a magnetic tape properly engaging a transducer head.
Figure 5:
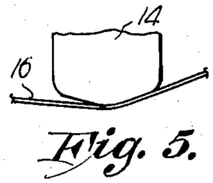
FIG. 5 is a diagrammatic illustration of an improper head-tape engagement condition which the instant invention overcomes.

FIGURE 5 illustrates the undesirable affect produced by a carrier which is canted or inclined longitudinally of the tape. Not only will the wrap angles for the heads be different, but the wrap will also assume an off-center configuration as illustrated in FIG. 5. In contrast, it may be seen in FIG. 4 that a tape having a proper wrap is centered on the crown 90 of the head.

As discussed above, proper and equal tape wrap is assured in the instant invention by the stopping action of undersurface 72 and pads 66–70. The three contact points presented by the pads always engage undersurface 72 at the same position and with the same pressure when solenoid 76 is energized, since leaves 54 do not interfere with the interengagement of the pads and undersurface 72 because of their flexibility. No parts subject to wear are employed which would ultimately change the positional relationship between the pads and undersurface 72. Thus, with carrier 18 always assuming the same operative position, proper location of carrier 18 with respect to the heads is achieved by selection of pads of appropriate thicknesses.

Having thus described the invention, what is claimed as new and desired to be secured by Letters Patent is:

1. In a tape transport:
a transducer head;
a tape carrier having means for guiding the tape as it is advanced;
a flexible leaf spring mounting said carrier for movement of the tape into and out of engagement with the head; and
stop means in the path of travel of the carrier in one direction for limiting the extent of movement of the tape toward the head, whereby the relationship of said carrier to the head when the tape is in engagement with the head is determined by said stop means.

2. In a tape transport:
support structure;
a tape carrier having means for guiding the tape as it is advanced;
a flexible, plate-like member coupling said carrier with said structure for movement of the carrier toward and away from the structure by flexure of said member;
stop means between said structure and said carrier for limiting the extent of movement of the latter toward the structure to a predetermined position;
a transducer head; and
means mounting said head on said structure in a disposition for operative engagement by said tape when said carrier is in said position.

3. In a tape transport:
support structure;
a transducer head;
means mounting said head on said structure;
a tape carrier having means for guiding the tape as it is advanced; and
a flexible, plate-like member coupling said carrier with said structure for movement of the carrier toward and away from the structure by flexure of said member,
said structure having a surface presenting a stop for said carrier during movement thereof toward the structure,
said carrier having contact means disposed to engage said surface and cooperate with the latter to limit the extent of movement of the carrier to a predetermined position where the carrier is disposed to place the tape in operative engagement with the head.

4. The invention of claim 3, wherein said contact means comprises three triangularly disposed contact pads between the structure and the carrier, and wherein is provided means for shifting said carrier toward said structure to said position, said shifting means being coupled with the carrier at a zone thereon aligned with the central portion of the triangle defined by said pads.

5. In a tape transport:
a support;
a transducer head;
means mounting said head in a normally stationary disposition with respect to said support;
a tape carrier having means for guiding the tape as it is advanced;

a flexible member mounting said carrier for movement of the tape into and out of engagement with the head;

means fixing said member to the support at a zone of the member spaced from said carrier, whereby to permit movement of the member, and hence the carrier, with respect to the head only by flexure of the member; and stop means in the path of travel of the carrier in one direction for limiting the extent of movement of the tape toward the head, whereby the relationship of said carrier to the head when the tape is in engagement with the head is determined by said stop means.

References Cited by the Examiner

UNITED STATES PATENTS

| | | | |
|---|---|---|---|
| 2,548,536 | 4/1951 | Johnson | 24—258 X |
| 2,867,439 | 1/1959 | Heurtier. | |

FOREIGN PATENTS

| | | |
|---|---|---|
| 1,166,714 | 6/1958 | France. |

M. HENSON WOOD, JR., *Primary Examiner.*

J. N. ERLICH, *Assistant Examiner.*